(12) United States Patent
Soundararajan et al.

(10) Patent No.: US 8,484,249 B1
(45) Date of Patent: Jul. 9, 2013

(54) GRAPH TRANSFORMATIONS TO CORRECT VIOLATIONS OF SERVICE LEVEL OBJECTIVES IN A DATA CENTER

(75) Inventors: Gokul Soundararajan, Sunnyvale, CA (US); Lakshmi Narayanan Bairavasundaram, Sunnyvale, CA (US); Vipul Mathur, Bangalore (IN); Rukma Ameet Talwadker, Bangalore (IN); Kaladhar Voruganti, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/235,043

(22) Filed: Sep. 16, 2011

(51) Int. Cl.
*G06F 17/30* (2006.01)
(52) U.S. Cl.
USPC ............ 707/791; 707/802; 707/822; 707/828
(58) Field of Classification Search
USPC .................................................. 707/600–899
See application file for complete search history.

(56) References Cited

U.S. PATENT DOCUMENTS 6,345,239 B1 * 2/2002 Bowman-Amuah .............. 703/6

* cited by examiner

*Primary Examiner* — Isaac M Woo
(74) *Attorney, Agent, or Firm* — Blakely, Sokoloff, Taylor & Zafman LLP

(57) ABSTRACT

Graph transformations are used by a data management system to correct violations of service-level objectives (SLOs) in a data center. In one aspect, a process is provided to manage a data center by receiving an indication of a violation of a service-level objective associated with the data center from a server in the data center. A graph representation and a transformations data container are retrieved by the data management system from data storage accessible to the data management system. The transformations data container includes one or more transformations. The transformation is processed to create a mutated graph from a data center representation from the graph representation. An option for managing the data center is determined as a result of evaluating the mutated graphs.

16 Claims, 12 Drawing Sheets

GRAPH TRANSFORMATIONS TO CORRECT VIOLATIONS OF SERVICE LEVEL OBJECTIVES IN A DATA CENTER

FIELD OF THE INVENTION

The field of invention can relate generally to storage systems, and, more specifically, to storage management systems.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2011, NetApp, Inc., All Rights Reserved.

BACKGROUND

A data center stores data for an organization and is managed by a data center management system. The data in the data center may be required to meet certain service-level objectives (SLOs), as set by a data administrator. Dynamism is a change in the total workload experienced by the data center management system. Dynamism can occur because of the large amounts of data in the data center and the large number of users using the data. Moreover, dynamism can occur when the set of applications running in the data center changes and as the storage workload generated by applications changes over time.

The data center management system for a data center primarily works with available storage resources, such as entire storage systems, aggregates of disk drives, etc. to address dynamism. Data center management systems typically rely on two methods to address dynamism: 1) pre-allocation of resources and 2) per-resource controllers.

In pre-allocation of resources, a data center management system pre-allocates resources to handle peak application needs. Examples of the pre-allocated resources include CPUs, memory, flash storage, disk drives, network, etc., or a combination thereof. The pre-allocated resources are often in the form of entire storage systems. Pre-allocation of resources often results in the use of more resources than necessary by the data center for current needs, thereby increasing cost, and possibly also resulting in resources not being available to satisfy new needs.

In per-resource controllers, a data center management system uses independent per-resource controllers to maintain service-level objectives (SLOs) for all applications. Because the per-resource controllers work independently, more resources may be expended than needed to address SLO needs. Moreover, the use of per-resource controllers may lead to additional SLO violations, useless work, and unavailability.

SUMMARY OF THE DESCRIPTION

Graph transformations are used by a data management system to correct violations of service-level objectives (SLOs) in a data center. In one aspect, a process is provided to manage a data center by receiving an indication of a violation of a service-level objective associated with the data center from a server in the data center. A graph representation and a transformations data container are retrieved by the data management system from data storage accessible to the data management system. The transformations data container includes one or more transformations. The transformation is processed to create a mutated graph from a data center representation from the graph representation. An option for managing the data center is determined as a result of evaluating the mutated graphs. Systems, methods, and machine readable storage media which perform or implement one or more embodiments are also described.

Other features of the present invention will be apparent from the accompanying drawings and from the detailed description which follows.

BRIEF DESCRIPTION OF THE DRAWINGS

The present invention is illustrated by way of example and not limited in the figures of the accompanying drawings, in which like references indicate similar elements and in which.

DETAILED DESCRIPTION

Figure 1:
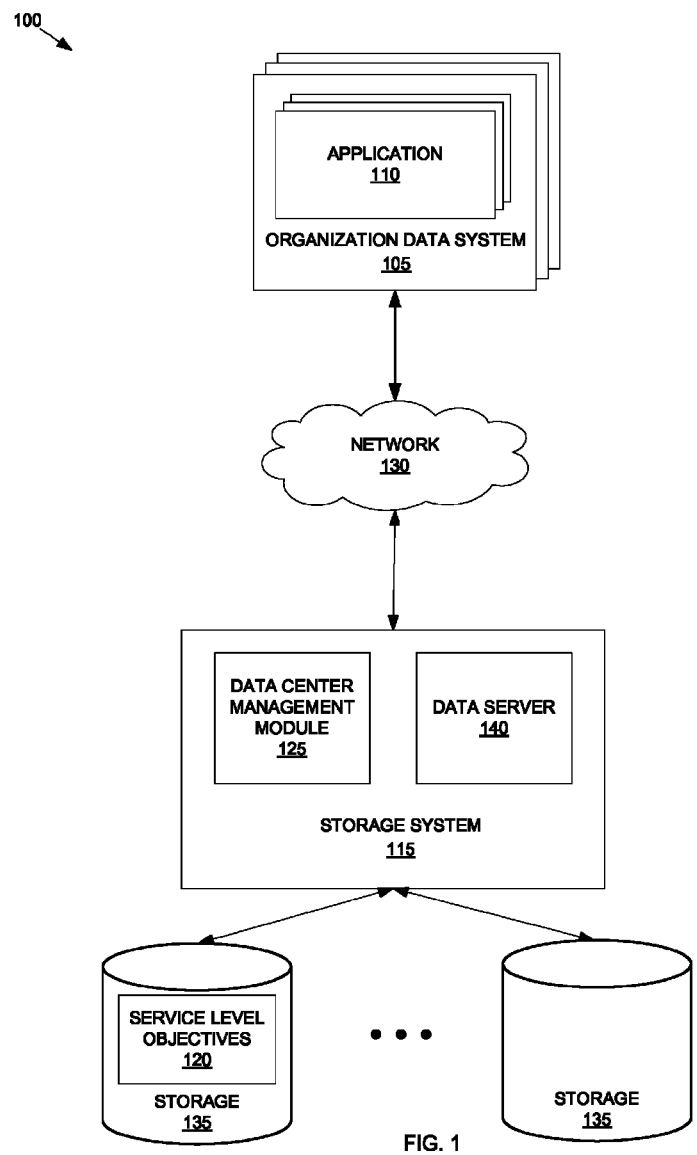
FIG. 1 illustrates an exemplary data center architecture including a storage system and organization data systems according to an embodiment.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Embodiments are described for using graph transformations to correct violations of service-level objectives (SLOs). References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

Correcting violations of SLOs in a data center is performed using graph transformations. A data center representation contains a representation for each entity in the data center, as well as a representation for each connection between components. A graph transformation includes a predicate that defines when a transformation can be applied to an entity, or component, in a data center. The graph transformation further includes a mutation that defines operations to be performed on the entities and connections of the data center representation. If the predicate of a transformation indicates that the transformation can be performed on an entity, the operations in the mutation for the transformation are performed on the data center representation, and a mutated graph containing the updated data center representation is created. Once all possible transformations are applied to the data center representation, and all mutated graphs are created, an option for managing the data center is determined as a result of evaluating the mutated graphs.

By registering service level objectives for multiple systems and/or vendors in a data center into a collaborative framework, a data center management system can address violations of service level objectives in a coordinated manner and create a solution for the violation(s) by taking all systems and vendors in the data center into account. Therefore, the data center can be configured by the data management system to meet the service level objectives of all systems in the data center. Moreover, the data center management system creates a graph representation for the data center and mutated graphs representing updates to the data center. The data center management system can rank the graph mutations by cost, thus limiting a possible explosion in cost that affects current service-level objectives based management techniques.

Figure 2:
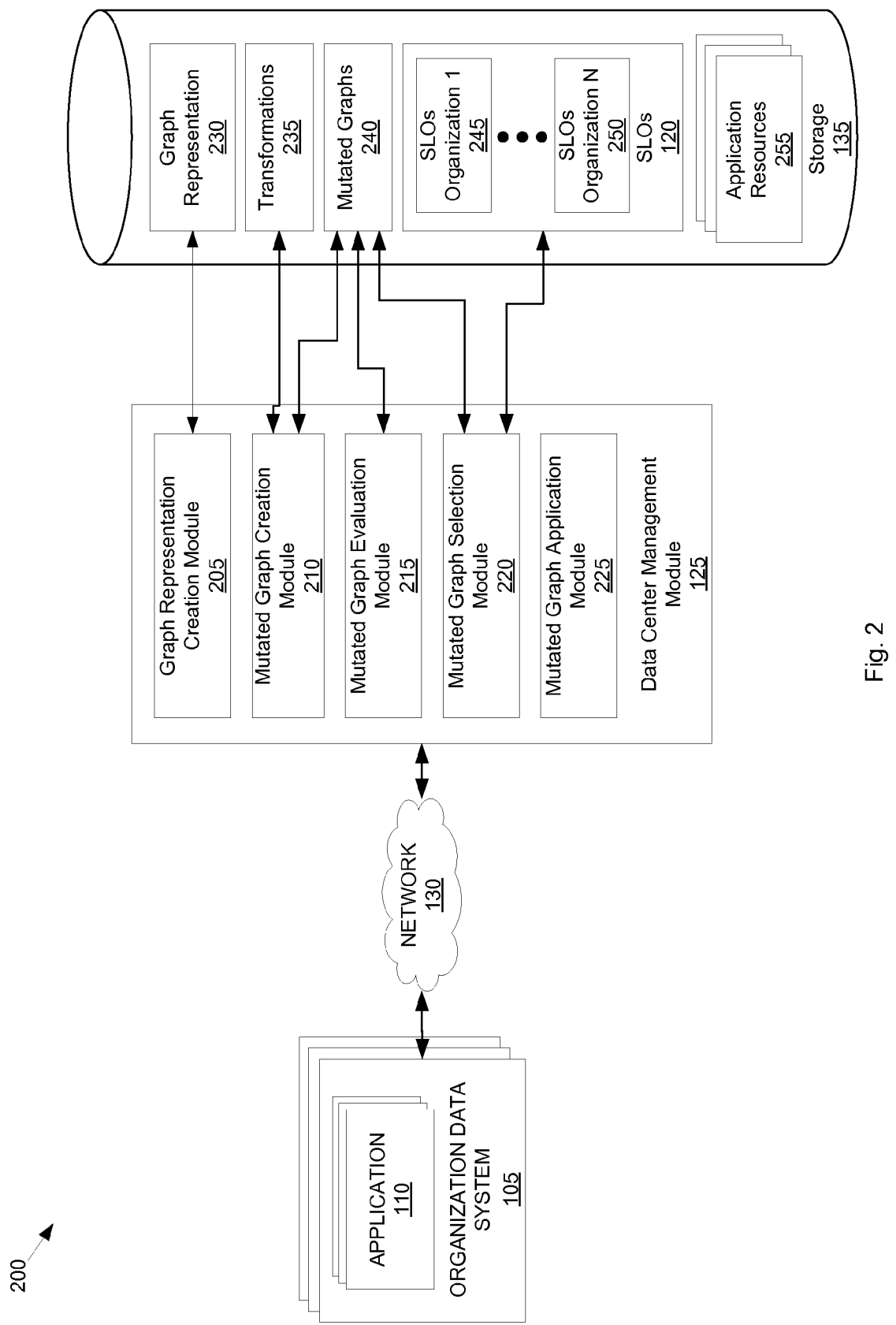
FIG. 2 illustrates a block diagram of an exemplary data system according to an embodiment.

FIG. 1 is an exemplary data center that addresses SLOs violations according to an embodiment. FIG. 2 is a block diagram of a data center illustrating a detailed view of data center management module 125 and storage system 135 of FIG. 1.

Referring to FIG. 1, data center 100 includes organization data system 105, storage system 115, and storage 135. Multiple organization data systems 105 share storage system 115 and storage 135. Each organization data system 105 can include one or more applications 110 that store and retrieve data for each organization data system 105 through storage system 115. Organization data system 105 and storage system 115 communicate with each other via network 130. Network 130 may be a public network (e.g., Internet) or a private network (e.g., local area network (LAN)).

Storage system 115 operates to store and manage storage objects (e.g., files) in storage 135. Storage system 115 includes data server 140 to manage the storage objects in storage 135. Storage 135 is one or more mass storage devices, such as magnetic or optical disks or tapes, or flash drives. The storage objects stored in storage 135 can include service level objectives 120 and storage objects used by application 110. Service level objectives 120 are management techniques used to meet quality of service requirements of an organization data system 105.

Data center management module 125 can determine whether service level objectives 120 are being violated for an organization data system 105 and can determine one or more options to address the violation.

It should be noted that although FIG. 1 illustrates the data center management module 125 as part of the storage system 115, it is not a requirement. In an alternate embodiment, the data center management module 125 may reside on an organization data system 105. In another alternate embodiment, data center management module 125 may reside on a separate system and may communicate with storage system 115 over a network such as network 130.

Referring to FIG. 2, data center 200 includes a more detailed view of data organization system 105 of FIG. 1, data center management module 125 of FIG. 1, and storage 135 of FIG. 1. Data center 200 can include organization data systems 105 for many clients. Organization data system 105 can include one or more applications 110. Application 110 can be a software program running on organization data system 105. Application 110 requires an amount of application resources 255 from storage 135. The amount of application resources required depends on a type of application 110.

Storage 135 includes one or more mass storage devices that may be organized into one or more volumes of a Redundant Array of Inexpensive Disks (RAID). The one or more mass storage devices in storage 135 store graph representation 230, transformations 235, mutated graphs 240, SLOs 120, and application resources 255.

SLOs 120 can include service level objectives for each organization data system 105. For example, if there are N organization data systems 105, there would be service level objectives for each of the N organization data systems 105. Therefore, SLOs Organization 1 245 represents the service level objectives for organization data system 1 and SLOs Organization N 250 represents the service level objectives for organization data system N. Service level objectives, such as SLOs Organization 1 245 and SLOs Organization N 250, can include policies for the datacenter 200. The policies may be resource constraints (e.g., a limit of 100 gigabytes of data), software constraints (e.g., a limit of three virtual machines per hypervisor), or performance constraints (e.g., a limit of 100 random input/output operations per second per disk). In one embodiment, a data administrator of organization data system 105 creates service level objectives for the organization data system 105. In an alternate embodiment, the service level objectives for an organization data system 105 are created by a storage administrator of data center 200. In another alternate embodiment, the service level objectives for an organization data system 105 are predefined when data center 200 is created. In yet another alternate embodiment, the service level objectives can be obtained from manuals or industry best practices documents. When service-level objectives are created for an organization data system 105, the service level objectives are transmitted over network 130 to be stored in SLOs 120 within storage 135.

Data center management module includes graph representation creation module 205, mutated graph creation module 210, mutated graph evaluation module 215, mutated graph selection module 220, and mutated graph application module 225.

Graph representation creation module 205 creates a graph representation for data center 200. In one embodiment, the graph representation for the data center is based on an analysis of the entities in the data center, such as hardware components, appliances, clusters, data stores, etc. In an alternate embodiment, the graph representation is based on a flow of data within the data center, such as data starting in a virtual machine, proceeding to a data store, proceeding to a volume, and then proceeding to an aggregate. In one embodiment, graph representation creation module 205 can create a graph representation for data center 200 every time a change is made in data center 200 (e.g., new component is added, configuration is changed, etc.) In an alternate embodiment, graph representation creation module 205 can create a graph representation for data center 200 periodically (e.g., every day, every week, etc.). Graph representation creation module 205 stores the created graph representation in graph representation 230.

Mutated graph creation module 210 creates one or more mutated graphs based on one or more transformations. A transformation includes a set of actions that can be taken on the graph representation 230. A transformation 235 is processed by modifying or mutating the graph representation 230 for the data center 200 using the set of actions in the transformation 235 to create a mutated graph 240. A violation of service level objectives 120 may be corrected by applying one or transformations 235 to the graph representation 230.

Mutated graph evaluation module 215 evaluates mutated graphs 240 to rank a transformation or a combination of transformations in transformation 235 using an expected cost of each transformation 235. In one embodiment, the cost of a transformation is an amount of resources used by data center 200 if the transformation is applied. In another embodiment, the cost of a transformation is a time to deploy a transformation for data center 200. Time to deploy may indicate the actual time it takes to deploy the transformation or may indicate a calculated time it would take to deploy the transformation based on a library of pre-set values (e.g., rebooting a server takes 60 seconds, etc.). In an alternate embodiment, the cost of a transformation is a monetary cost (e.g., hardware/software costs or operating costs). In alternate embodiments, the cost of a transformation can be a combination of the above techniques, such as overall profit generated with the transformation (e.g., revenue minus cost).

Mutated graph selection module 220 selects a mutated graph 240, and therefore one or more corresponding transformations from transformations 235, to use in data center 200 to correct a violation of SLO 120. In one embodiment, mutated graph selection module 220 selects a mutated graph 240 by choosing the mutated graph having a transformation with the lowest expected cost that meets the SLOs 120. In one embodiment, all the SLOs 120 are considered in selecting the mutated graph. In an alternate embodiment, the SLOs corresponding to a subset of the data center are considered in selecting the mutated graph (e.g., larger organization, organization currently violating the SLO, etc.). In another alternate embodiment, the SLOs for a specific application running in the data center are considered in selecting the mutated graph. In embodiments that do not consider all the SLOs 120, the transformations that meet a specified time or resource constraint are considered (e.g., look for transformations that fix the SLO violation within 5 minutes).

Mutated graph application module 225 deploys the mutated graph 240 selected by mutated graph selection module 220 in data center 200. Mutated graph application module 225 deploys the mutated graph 240 by sending commands to the relevant systems in the data center corresponding to the actions in the selected transformations 235 (e.g., to storage system 135, to organization data system 105, to both storage system 135 and organization data system 105, etc.).

Figure 3:
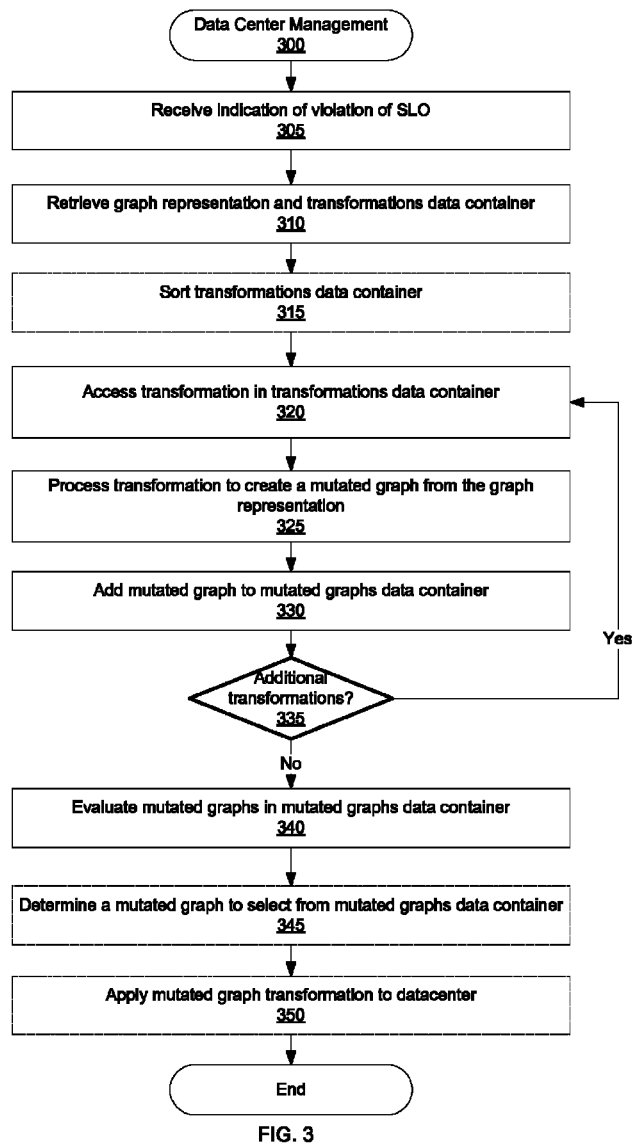
FIG. 3 illustrates a flow diagram of a data center management method according to an embodiment.

FIG. 3 is an exemplary method 300 of data center management. The method 300 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 305-350 in FIG. 3. In certain embodiments, method 300 may be performed by data center management module 125.

At instruction block 305, an indication is received of a SLO violation from a data center. In one embodiment, the indication includes identifying information, such as an application that triggered the SLO violation, a data organization system in which the violation occurred, etc. In an alternate embodiment, no identifying information is included in the indication from the data center.

At instruction block 310, a graph representation and a transformations data container are retrieved. The graph representation is retrieved from data storage accessible to the data center. In one embodiment, the transformations data container is retrieved by accessing the transformations data container stored a storage system. In this embodiment, the transformations data container may be predefined by a data administrator. In an alternate embodiment, the transformations data container is requested from one or more systems in a data center. For example, a vendor system may include a set of transformations for managing specific types of resources, such as server resources. If the data center uses a collaborative management approach, the data center can query the vendor system for the set of transformations. This set of transformations can be merged with other sets of transformations received from other storage systems and/or vendor systems. Turning now to graph transformations in more detail, the continued description of FIG. 3 continues below.

The graph representation describes each entity and connection in the data center. Each entity, or node, represented in the graph representation has one or more properties, such as a performance measurement, a configuration setting, or layout information of the graph representation. For example, an entity in the graph has several attributes. These attributes can include a name, such as, System-A, a type, such as Storage System Model X, a type hierarchy, such as Storage System, and information about entities neighboring the current entity, such as incoming and/or outgoing edges. The name of an entity is a unique identifier for the entity. The type of an entity is a specific model for the entity. The type hierarchy of an entity describes the lineage of the entity. In one embodiment, the graph representation is obtained by accessing the data center graph representation stored in a storage system. In an alternate embodiment, the data center graph representation is obtained by submitting a request for the data center graph representation. The graph representation is created as described below with reference to FIG. 4.

The transformations data container includes one or more transformations. A transformation is a set of actions, or mutations, that can update the graph representation to create a mutated graph. The transformation describes a change that can be applied to the data center graph representation. A transformation can be defined independently of underlying software or software versions being used in a data center. A transformation is identified by a unique name to allow the transformation to be saved in a storage device in the data center (e.g., a database) and later retrieved for future applications. In one embodiment, each transformation includes a type of the transformation (e.g., EXTENDS), a predicate, a list of mutations to be applied, and a cost of the transformation.

The type of the transformation defines the scope of the transformation by specifying the locations in the graph representation where the transformation may be applied. A type of a transformation may be defined using a keyword (e.g., EXTENDS) followed by the type of transform (e.g., EXTENDS {node} for a node transformation). The type of transformation allows for the utilization of common functions to evaluate transformations. Therefore, a type of transformation will allow for all transformations of that type to be evaluated in the same manner (e.g., using the same matching algorithm). If a cost is not attributed to a transformation, the type of transformation can determine the cost of the transformation, as described below in more detail.

In one embodiment, a type of a transformation can be a node transformation. A node transformation affects one or more nodes in a graph representation of a data center, but does not modify any existing edges of the graph representation. In one example, a transformation which throttles the traffic for a storage volume in the data center is a node transformation because the transformation affects only the volume for which the traffic is throttled (only affects the rate at which I/O requests coming into the volume are serviced). Other examples of node transformations include ballooning and deduplication. Ballooning allocates more resources (e.g., CPU or RAM) to an application. Using a ballooning transformation, the storage server may keep more of the data accessed in RAM at the storage server by allocating a larger space/proportion to one application. Deduplication removes duplicate contents of data from the storage server. A deduplication transformation, defined as a node transformation, may use storage space more efficiently than a non-deduplication transformation because the storage server only stores a single copy of each unique data element (e.g., file).

In an alternate embodiment, a type of a transformation can be an edge transformation. An edge transformation affects one or more edges of a graph representation of a data center, but does not affect any existing nodes in the graph representation. In one example, a transformation that adds a cache is an edge transformation. Although the add cache transformation adds a node to the graph transformation, it does not modify any existing nodes. Instead, the add cache transformation re-routes traffic along one edge from a source to a destination by adding two edges (one from the source to the cache and another from the cache to the destination). Other examples of edge transformations include caching, compression, encryption, deduplication, etc.

In another alternate embodiment, a type of a transformation can be a graph transformation. In one embodiment, a graph transformation may be employed as both a node and/or an edge transformation depending on the particular implementation of the transformation. In another embodiment, a graph transformation is a transformation that requires both a modification of a node and a modification of at least one edge in a graph representation.

Examples of graph transformations include replication, partitioning, migration of data, etc. Replication and partitioning both take traffic going to one node and route it to many nodes. Replication may be used where one storage server does not have the resources to handle all requests. In one example, a replication transformation may add new storage nodes (i.e., adding more resources), insert a re-routing node implementing a routing policy making all data available to all storage nodes (i.e., a piece of hardware/software that determines how to send to 1 of N nodes), and add new edges (connections) to the additional storage nodes. Partitioning may also be used where one storage server does not have the resources to handle all requests. In one example, a partitioning transformation may add new storage nodes (i.e., adding more resources), insert a re-routing node implementing a routing policy making each data element available at only a subset of storage nodes (i.e., a piece of hardware/software that determines how to send to 1 of N nodes), and add new edges (connections) to the additional storage nodes. The migration of data is the physical movement of data from one storage server to another storage server. In one example, the migration of data transformation may include the creation/procurement of a new storage server, creating an edge (i.e., a connection to copy the data to the new storage server), a node change to re-route new traffic to go to the new storage server node, and shutting down (deleting data) from the old storage server.

In yet another alternate embodiment, a type of a transformation can be a pre-defined transformation (e.g., node, edge, graph, etc.). By extending a new transformation to a pre-defined transformation, the new transformation can leverage any of the existing parts of the pre-defined transformation (e.g., graph matching algorithm, predicates, mutations, etc.), and can also customize any parts of the pre-defined transformation.

A transformation is further defined by a predicate, which limits the scope of the transformation. The predicate defines the applicability of a transformation by limiting the applicability of the transformation using one or more constraints. For example, the predicate can limit the applicability of a transformation using a structural constraint, a resource constraint, a policy constraint, a performance constraint, etc. Structural constraints limit a transformation to only be applied for particular nodes. For example, a structural constraint can limit a virtual machine to only be created on a hypervisor. Therefore, adding a node for a virtual machine could only be performed by applying a transformation on a hypervisor node in a data center.

Resource constraints limit a transformation based on resource scarcity. For example, a 64 GB volume would need a capacity of at least 64 GB in the underlying disk. If the underlying disk did not have at least a 64 GB capacity, the transformation would be prevented from being applied to a data center.

Policy constraints limit predefined actions as specified in administrator policies. For example, an administrator can limit the number of virtual machines running on each hypervisor to be three. Policy constraints allow an administrator to set constraints for one or more organization data systems in a data center or for an entire data center without needing to specifically enforce those constraints. A transformation will not be applied to an organization data system or the data center if the policy constraint is violated by the transformation.

Performance constraints limit a transformation that may cause unacceptable or unstable performance. For example, allowing too many virtual machines to run on a hypervisor can result in memory thrashing. Memory thrashing can occur when the storage system spends a disproportionate time swapping out pages in the storage system to service memory requests by the virtual machines. Memory thrashing can slow down the virtual machines, the storage system, and the data center, thereby affecting performance and potentially causing the storage devices in the storage system to overheat. Therefore, a performance constraint can be placed on a transformation to avoid such situations.

A list of mutations in a transformation defines the set of graph changes made by the transformation to correct, or handle, a service level objective violation. Examples of graph changes are: editing a configuration on a node, adding a new node, deleting an existing node, and changing entire subgraphs in the graph representation.

The cost of a transformation is an expected cost of the transformation when applied to a data center. In one embodiment, a node transformation has the lowest cost, an edge transformation has the next lowest cost, and a graph transformation has the highest overall cost. In an alternate embodiment, an edge transformation has the lowest cost, a node transformation has the next lowest cost, and a graph transformation has the highest overall cost. In one embodiment, the cost of a transformation is defined by an administrator. In an alternate embodiment, the cost of a transformation is defined based on a policy. In another alternate embodiment, the cost of a transformation is defined based on a service-level objective. In yet another alternate embodiment, the cost of a transformation is not specifically defined. In this embodiment, the cost is determined using the type of the transformation. For example, a data center defines and ranks 3 types of transformations: node, edge, and graph transformation, node being the least costly (e.g., fastest, costs the least amount of money, etc.) and graph being the most costly (e.g., slowest, costs the most amount of money, etc.). If a specific cost is not defined for a transformation, but the transformation is a node transformation, that transformation's cost is determined to be lower than a transformation that is an edge or node transformation.

Two examples of transformations include a memory ballooning transformation and an add cache transformation. Memory ballooning allows a hypervisor hosting a virtual machine to influence the memory management of the virtual machine. Therefore, in one embodiment, a transformation for memory ballooning includes a predicate defining that the transformation can only be applied to a virtual machine. In this embodiment, the type of the memory ballooning transformation is a node transformation. Moreover, in one embodiment, a mutation for the memory ballooning transformation mutates, or modifies, the graph representation to create a mutated graph that includes a virtual machine node, or entity, that has a memory of a predefined size. In one embodiment, a memory ballooning transformation is defined to be independent of the hypervisor implementation used in the virtual machine. However, in alternate embodiments, the particular settings that need to be changed in a virtual machine may be different on various hypervisors. In one embodiment, a memory ballooning transformation defines, in the predicate, the memory ballooning to occur between a minimum and maximum threshold. In one embodiment, a memory ballooning transformation defines, in the mutation, a memory size for the virtual machine and a burst threshold for the memory, such as up to 25% more than the defined size limit of the memory.

In some embodiments, a transformation for adding a caching system to a data center interposes a caching system in the data center between a client in the data center and a storage filer. In some embodiments, adding a caching system creates a caching layer in the storage system that automatically adapts to changing usage patterns, thereby eliminating performance bottlenecks. In some embodiments, adding a caching system automatically replicates and serves hot data sets anywhere in the data center infrastructure using local caching volumes.

In one embodiment, a transformation for adding a caching system includes a predicate that addresses all the constraints of the caching system software. In one embodiment, these constraints include that storage must be on storage made by a predetermined manufacturer, such as NetApp, Inc. (NetApp®) of Sunnyvale, Calif., because traffic between the caching system is specific to storage made by the predetermined manufacturer. Moreover, in some embodiments, the network protocol to be used by a transformation to add a caching system is limited to a predetermined protocol, such as the Network File System (NFS) protocol. In addition, in some embodiments, if the caching system cannot be layered, a constraint is included in the predicate of the transformation to add a caching system to indicate that the connection target should be a filer, rather than another caching system. Furthermore, in some embodiments, the predicate for a transformation for adding a caching system is defined to benefit workloads in a storage system that are read skewed by defining that a read I/O percentage of the cached workload should be higher than a predefined amount, such as 80%.

In some embodiments, a transformation to add a caching system includes each mutation of the graph representation that is required to add the caching system to the graph representation. In some embodiments, the mutations required include creating a caching entity, deleting an existing connection between a first entity and a second entity, adding the caching entity to the graph representation, creating a connection between the first entity and the caching entity, and creating a connection between the caching entity and the second entity. An example of the mutation of the graph representation for a transformation to add a caching system is described below with reference to FIG. 7.

Returning to the discussion of FIG. 3, at instruction block 315, the transformations data container is sorted. The transformations data container is sorted using the cost of each transformation, with the transformation with the lowest cost being the most desirable transformation. At instruction block 320, a transformation in the transformations data container is accessed. The next transformation in the transformations data container is read.

At instruction block 325, a mutated graph is generated by applying the transformation to the data center graph representation. Applying the transformation to the data center graph representation is described below in reference to FIG. 5. In one embodiment, only the current transformation is applied to the data center graph representation. In an alternate embodiment, the current transformation is applied to the data center graph representation in combination with other transformations in the transformations data container. In this embodiment, a plurality of mutated graphs is generated for the current transformation in a predetermined order. The predetermined order of applying the transformations is based on one or more policies. In one embodiment, the transformations are applied in the lowest cost order (e.g., apply the lowest cost transformation followed by the second lowest cost transformation followed by the third lowest cost transformation, etc.). In an alternate embodiment, the transformations are applied in an order defined by an administrator. In another alternate embodiment, the transformations are applied in an order based on a historical record. The historical record can include a history of previous violations and the corresponding transformations applied to remedy the violation. Using the historical data, a transformation that was successful for a previous violation is selected for a current violation (e.g., a previous violation of the same type as the current violation). Other embodiments of an order of applying transformations may be selected without departing from the scope of the present invention. An example of applying a series of transformations to a data center graph representation is described below in reference to FIG. 7.

At instruction block 330, the mutated graph is added to a mutated graphs data container that includes all mutated graphs for the data center.

At instruction block 335, a determination is made of whether there are any additional transformations in the transformations data container that can be applied to the data center graph representation. The determination is made by accessing the transformations data container and evaluating whether all transformations in the transformations data container have been applied. In one embodiment, evaluating whether all transformations have been applied is performed by maintaining a data container listing the transformations in the transformations data container have been applied to the data center graph representation. The transformations data container is then compared to the data container listing the transformations that have been applied to determine if all the transformations in the transformations data container have been applied (if all transformations in the transformations data container are also listed in the data container listing the transformations that have been applied). In an alternate embodiment, evaluating whether all transformations have been applied is performed by removing a transformation from the transformations data container once the transformation has been applied. All transformations have been applied to the data center graph representation when the transformations data container has no entries remaining. If all transformations have been applied, the method continues to block 340. If all transformations have not been applied, the method returns to block 320 to apply the next transformation.

At instruction block 340, the mutated graphs in the mutated graphs data container are evaluated. The mutated graphs are evaluated by determining the feasibility of the mutation represented by the mutated graph. In one embodiment, the feasibility is determined by performing a binary check of whether the mutation would improve the state of the data center. In this embodiment, the binary check of whether the mutation would improve the state of the data center determines if the mutation is possible in the data center (e.g., whether a component needed to perform the mutation exists in the data center). In an alternate embodiment, the feasibility is determined by interacting with the components of the data center. In this embodiment, the interaction includes determining if the attributes of the components in the data center match the attributes needed to apply the mutation.

Based on the evaluation of the mutated graphs, a mutated graph is selected from the mutated graphs data container at instruction block 345. In one embodiment, the mutated graph with the lowest actual cost is selected. In an alternate embodiment, the mutated graph that meets the service level objectives for the data center is selected. In another alternate embodiment, the mutated graph meeting the service level objectives for the data center and has the lowest cost as compared to other mutated graphs that meet the service level objectives is selected.

At instruction block 350, the selected mutated graph is applied to the data center. In one embodiment, the selected mutated graph is applied to the data center by issuing a command to the data center corresponding to each mutation in the mutation list for the transformation used to create the selected mutated graph. In an alternate embodiment, the selected mutated graph is applied to the data center by creating a data container listing the mutations required to perform the transformation used to create the selected mutated graph. This data container may be provided (e.g., via email or stored in a specific location) to an administrator of the data center. The administrator of the data center may use the information in the data container to execute the transformation in the data center. In one embodiment, the data container is a step-by-step textual description of the mutations that are required to perform the transformation. In an alternate embodiment, the data container is a visual representation of the mutations that are required to perform the transformation.

Figure 4:
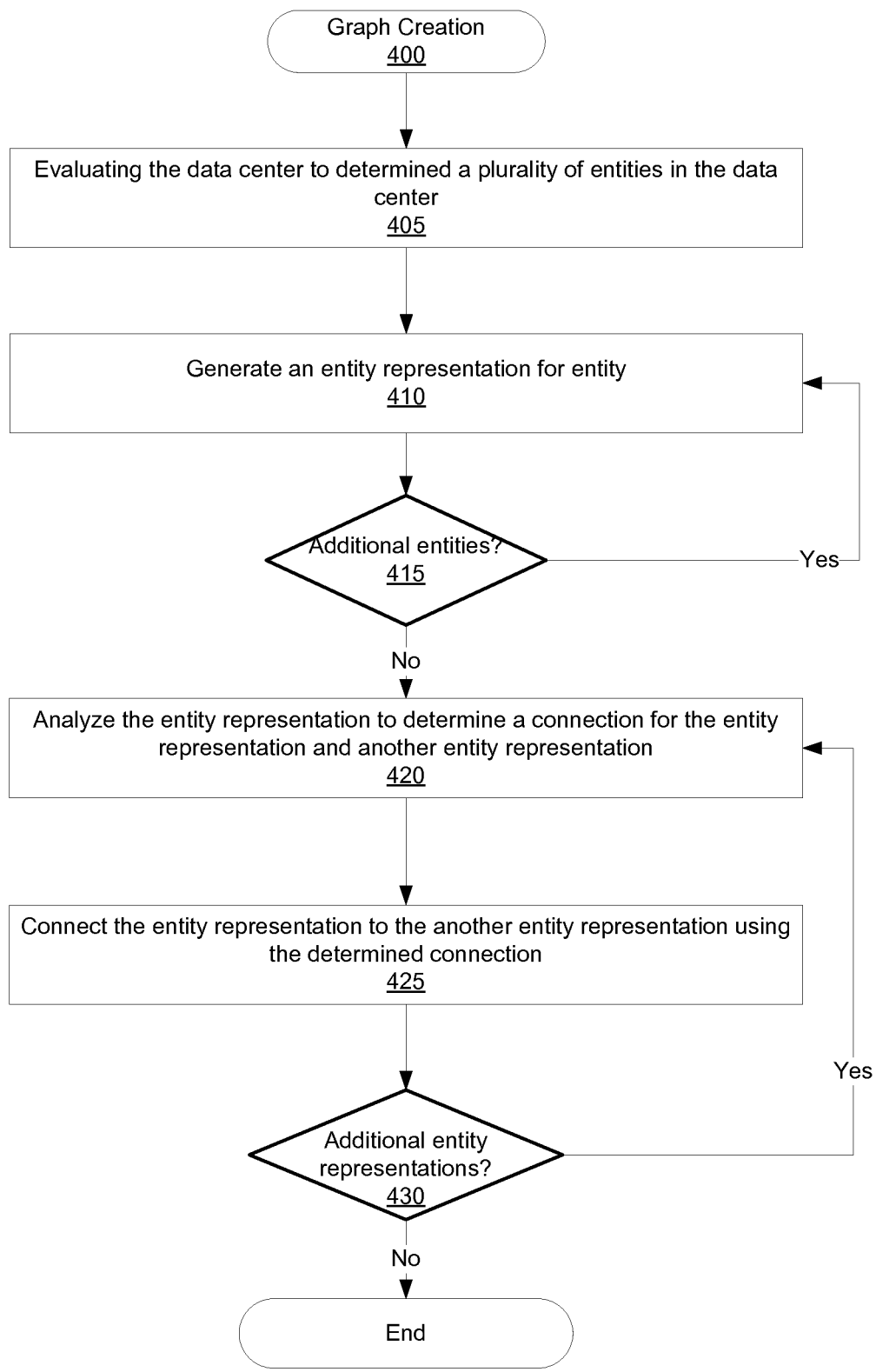
FIG. 4 illustrates a flow diagram of a graph creation method according to an embodiment.

FIG. 4 is an exemplary method 400 of graph creation. The method 400 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 405-420 in FIG. 4. In certain embodiments, method 400 may be performed by data center management module 125 of FIG. 1 or graph representation creation module 205 of FIG. 2.

At instruction block 405, the data center is evaluated to determine the entities in the data center. An entity in the data center can be a physical entity (a hardware device, e.g., controller, disk, switch, etc.), a logical entity (e.g., virtual servers), or an application entity (e.g., data sets data sets created by a user or an application). Physical entities are software components that monitor physical devices. Logical entities are created by the storage system to either partition resources (e.g., several volumes can be created on an aggregate) or to coalesce resources (e.g., several disks form a RAID group). Application entities represent a data center user's point of view (e.g., database data files, a data backup). The data center is evaluated by sending a request to the data center to enumerate the physical hardware devices in the data center to determine the physical entities and by querying the storage system to determine the logical entities. In one embodiment, application entities are determined by a person, such as a customer of the data center or an administrator of the data center. In an alternate embodiment, application entities are determined by a software application. For example, a copy of a customer database can be automatically classified by a software application as another application. The determined entities are stored in a entities data container.

At instruction block 410, an entity representation is made in a graph for an entity in the data center. An entity representation for each type of entity (e.g., physical, logical, application) is predefined. For example, a physical entity may be represented by a circle drawn with a solid line and a logical entity may be represented by a circle drawn with a dotted line. The entity representation includes a definition of features of the entity. For example, the features of a hardware device are the hardware resources of the hardware device (e.g., CPU, RAM, storage disks, etc.). The entity representation can be pre-defined based on the node type (i.e., a storage server has CPU, memory, and disks), specified by the administrator, or queried from the system itself, such as by requesting a list of connected disks from a storage server. The entity representation is stored in an entity representations data container.

At instruction block 415, a determination is made of whether there is an additional entity in the data center that requires an entity representation. The determination is made by reading the entities data container and evaluating if any of the entities in the entities data container do not have a corresponding entity representation in the entity representations data container. If there is an additional entity that requires an entity representation, the method returns to block 410 to generate an entity representation for the additional entity. If there is no additional entity in the data center that requires an entity representation, the method proceeds to block 420.

At instruction block 420, an entity representation is analyzed to determine a connection for the entity representation and another entity representation. Entity representations can be connected by a physical connection or a logical connection. A physical connection represents a hardware constraint or a software constraint. For example, a hard disk is physically connected to a shelf and a file system volume is logically connected to an underlying RAID group. In another example, a virtual machine is logically connected to its underlying hypervisor. In one embodiment, a connection between the entity representation and another entity representation is determined by reading a configuration file associated with the entity representation or the entity. In an alternate embodiment, a connection is determined by communicating with the entity corresponding to the entity representation over a connection. For example, a message is sent to the entity and a reply is received from the entity.

At instruction block 425, the entity representation is connected to the other entity representation using the determined connection. The connection is performed by adding the entities and the connection between the entities in the graph representation for the data center.

At instruction block 430, the entity representations data container is evaluated to determine if there are any additional entity representations that require a connection. The determination is made by reading the entity representations data container and evaluating if any of the entity representations in the entity representations data container are not in the graph representation for the data center. If there is an additional entity representation that requires a connection, the method returns to instruction block 420 to generate an entity representation for the additional entity. If there is no additional entity in the data center that requires an entity representation, the method ends.

The graph transformation for the data center is complete once the entities have been connected together. An illustration of an exemplary graph representation is described below in FIG. 6B. The graph representation in FIG. 6B is based on the data center illustrated in FIG. 6A. Both figures are described in more detail below.

Figure 5:
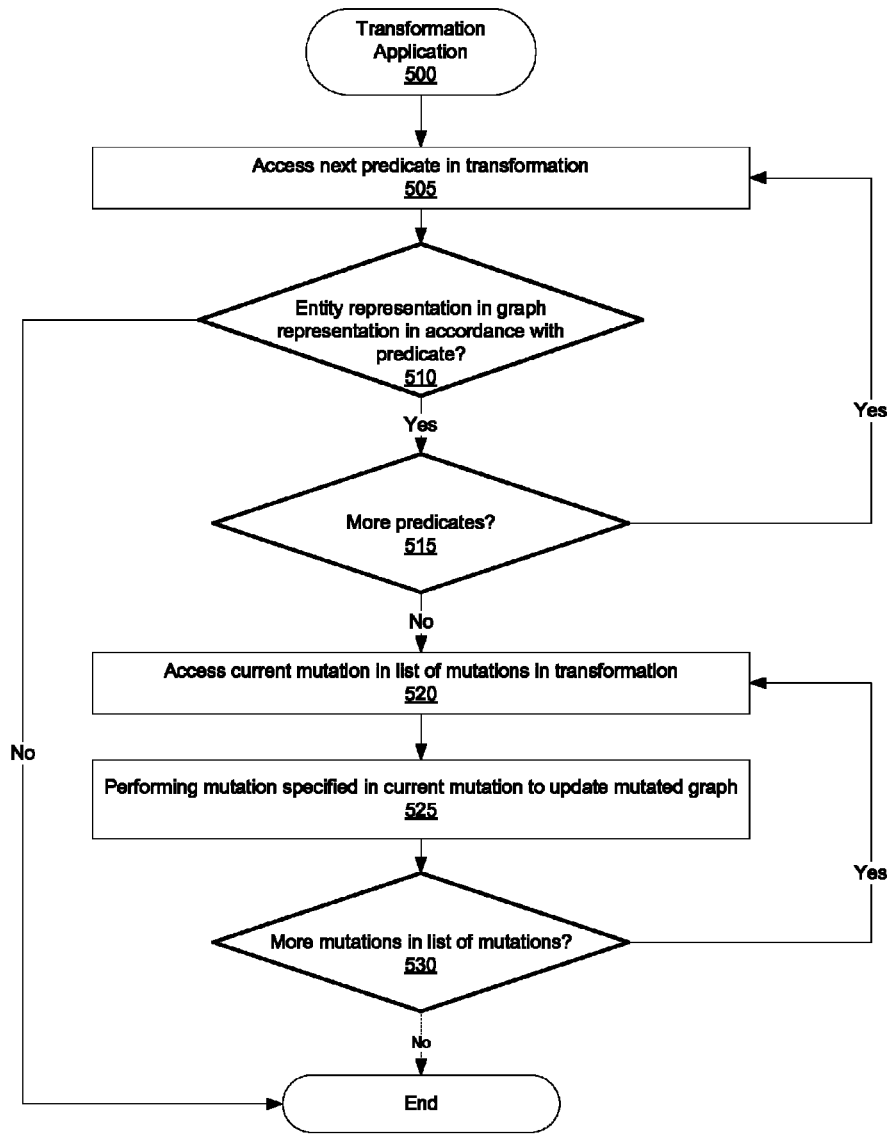
FIG. 5 illustrates a flow diagram of a transformation application method according to an embodiment.

FIG. 5 is an exemplary method 500 of transformation application. The method 500 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 505-530 in FIG. 5. In certain embodiments, method 500 may be performed by data center management module 125 of FIG. 1 or mutated graph creation module 210 of FIG. 2.

At instruction block 505, a predicate in a transformation is accessed from a transformation data container in storage, such as transformations 235 in storage 135. The predicate defines constraints to be met in processing the transformation.

At instruction block 510, a determination is made of whether the entity representation in the graph representation is in accordance with the predicate. In one embodiment, the determination is made by comparing one or more features of the current entity representation to the predicate. For example, as in the transformation to add a caching system defined above, a determination is made if the entity representation for a physical entity representing storage is made by the predetermined manufacturer defined in the predicate. If the storage is made by the predetermined manufacturer, the determination would be positive. If the storage is not made by the predetermined manufacturer storage, the determination would be negative. If the feature(s) of the entity in the graph representation do not match the predicate, the method 500 ends because the transformation cannot be applied to the data center. If the feature(s) of the entity in the graph representation match the predicate, the method 500 proceeds to instruction block 515. In an alternate embodiment, the determination is made by comparing one or more features of the current entity to the predicate and one or more features of entities associated with the current entity to the predicate. For example, if the current entity is a server, and the predicate requires a certain model of a disk in a server, the determination would compare the predicate to the model of a disk (entity associated with the current entity) in the server.

At instruction block 515, a determination is made of whether there are more predicates in the transformation. If there are more predicates in the transformation, the method 500 returns to instruction block 505 to determine if the entity representation in the graph transformation is in accordance with the next predicate. If there are no more predicates in the transformation, the method 500 proceeds to instruction block 520.

At instruction block 520, the current mutation in the list of mutations in the transformation is accessed. If there are no mutations listed in the transformation, the graph representation is not mutated (or updated).

At instruction block 525, the mutation as specified in the current mutation is perform to update the mutated graph. For example, in the transformation to add a caching system defined above, if the current mutation was to add a new node, a new node would be added to the mutated graph.

At instruction block 530, a determination is made if there are more mutations in the list of mutations to be applied to the mutated graph. If there are additional mutations in the list of mutations, the method 500 returns to instruction block 520. If there are no additional mutations in the list of mutations, the method 500 ends.

Figure 6A:
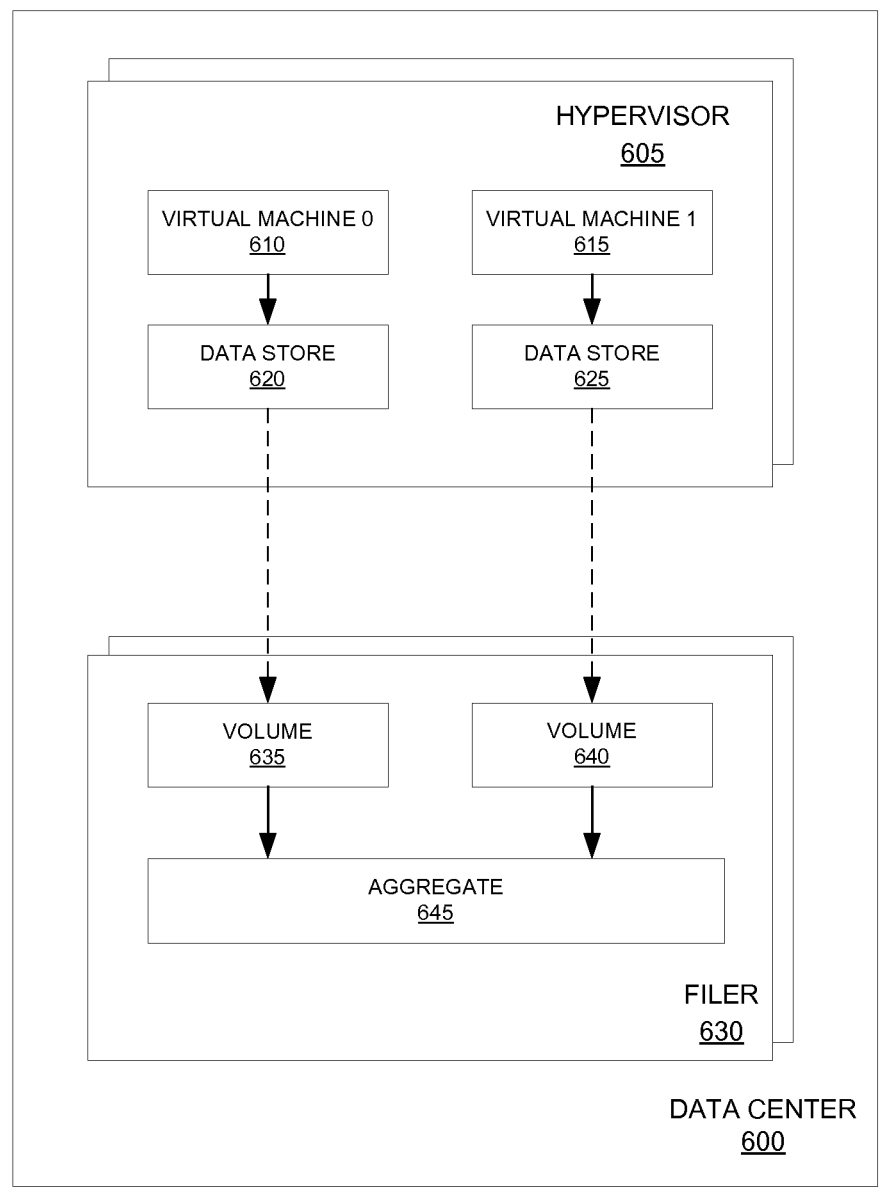
FIG. 6A illustrates an exemplary data center according to an embodiment.
Figure 6B:
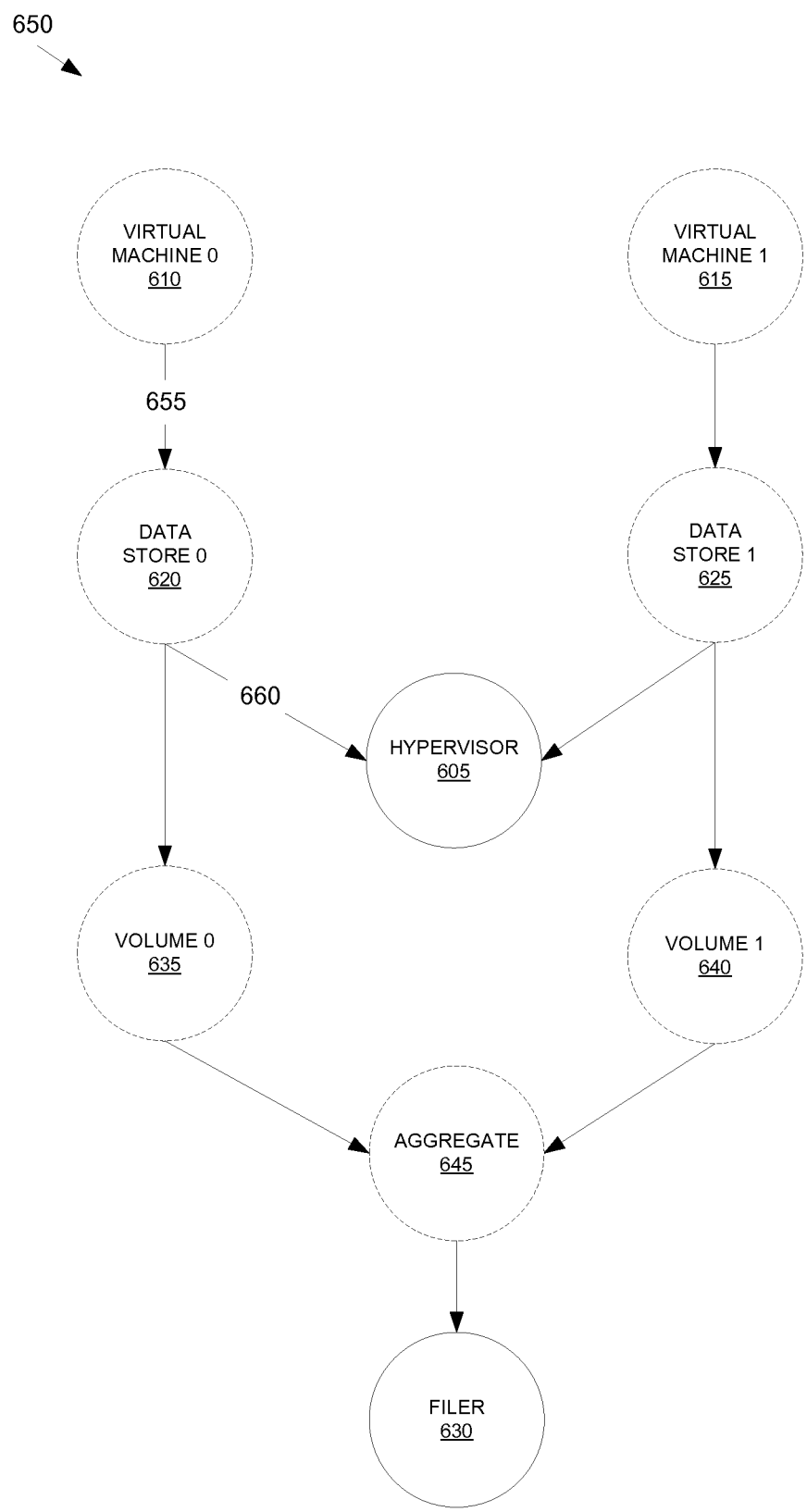
FIG. 6B illustrates an exemplary graph representation of a data center according to an embodiment.

FIG. 6A represents a data center commonly known to one of ordinary skill in the art. Data center 600 illustrates different entities and connections commonly found in a data center. Virtual machine 0 610 and virtual machine 1 615 are hosted on hypervisor 605. The data for virtual machine 0 610 is stored in data store 620 hosted by filer 630. The data for virtual machine 1 625 is stored in data store 625 hosted by filer 630. The data for virtual machine 0 610 and virtual machine 1 615 is exported by filer 630, and are mounted using the NFS protocol by hypervisor 605 and exported as data stores 620 and 625 to virtual machines 610 and 615.

FIG. 6B is an exemplary graph representation of data center 600. In one embodiment, data store 0 620 and data store 1 625 are represented as circles with dotted lines, illustrating that data store 0 620 and data store 1 625 are logical entities. In an alternate embodiment, data store 0 620 and data store 1 625 is represented as circles with solid lines to illustrate that data store 0 620 and data store 1 625 are logical entities. Connection 655 logically connects virtual machine 0 610 to data store 0 620. Data store 0 620 and data store 625 are logically connected to hypervisor 605. In one embodiment, hypervisor 605 is represented as a circle with a solid line, illustrating that hypervisor 605 is a physical entity. In an alternate embodiment, hypervisor 605 is represented as a circle with a dotted line to illustrate that hypervisor 605 is a physical entity. Data store 0 620 is connected by connection 660 to hypervisor 605. Data store 0 620 and data store 625 are logically connected to volume 0 635 and volume 1 640. Moreover, volume 0 635 and volume 1 640 are connected to aggregate 645. Aggregate 645 is connected to filer 630. Filer 630 is a physical entity because filer 630 is illustrated as a circle with a solid line.

Figure 7:
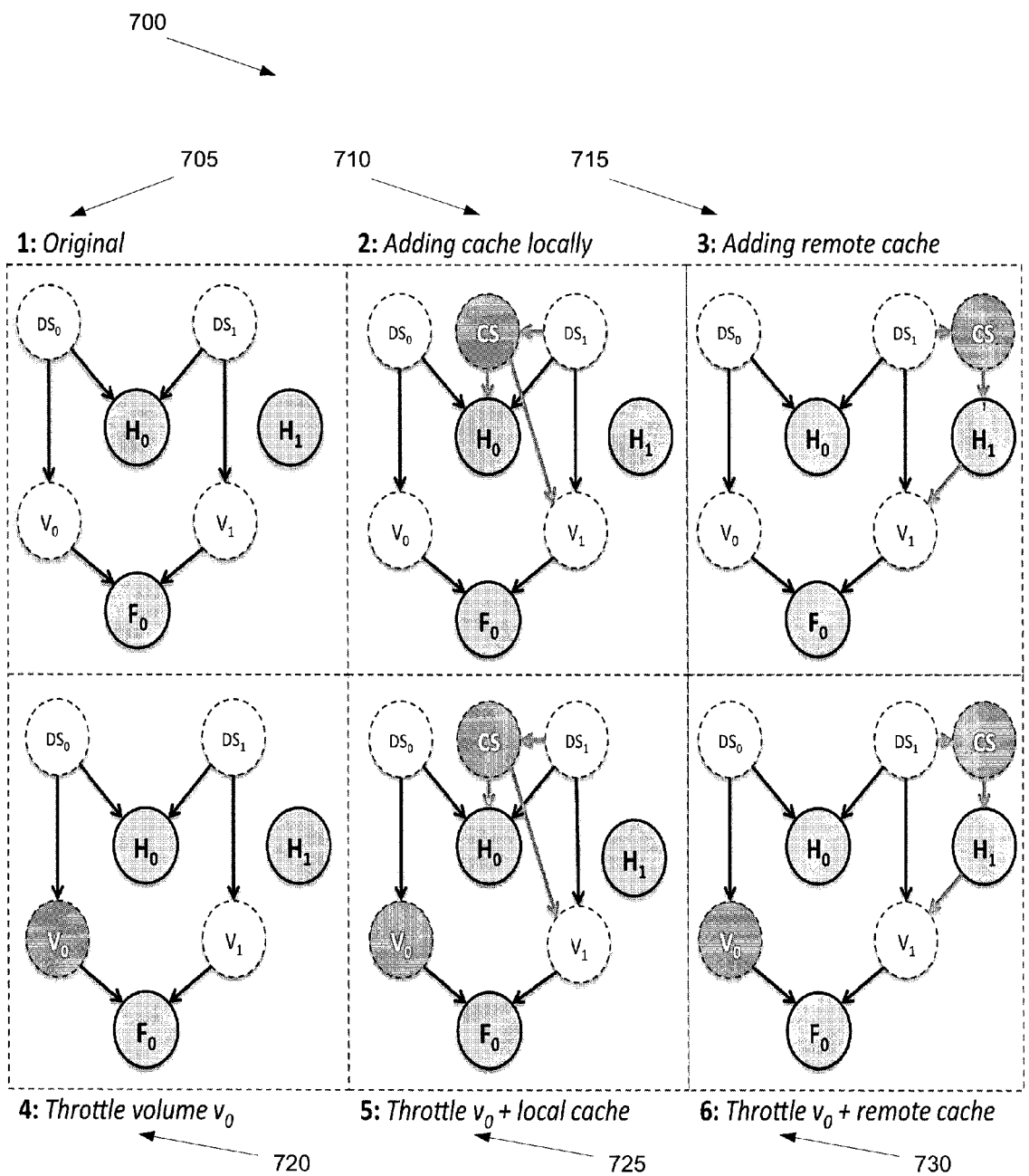
FIG. 7 illustrates mutated graphs using transformation according to an embodiment.

FIG. 7 illustrates a plurality of mutated graphs created by processing transformations. Graph 705 shows an original graph representation for a data center, such as created by method 400 of FIG. 4. Mutated graph 710 illustrates a mutated graph created by processing a transformation that adds a cache locally to the original graph representation 705. Mutated graph 715 illustrates a mutated graph created by processing a transformation that adds a cache remotely to the original graph representation 705. Mutated graph 720 illustrates a mutated graph created by processing a transformation that throttles a volume in the data center. Mutated graph 725 illustrates a mutated graph created by processing a transformation that throttles a volume in the data center and a transformation that adds a local cache to the data center. Mutated graph 730 illustrates a mutated graph created by processing a transformation that throttles a volume in the data center and adds a remote cache to the data center.

Figure 8A:
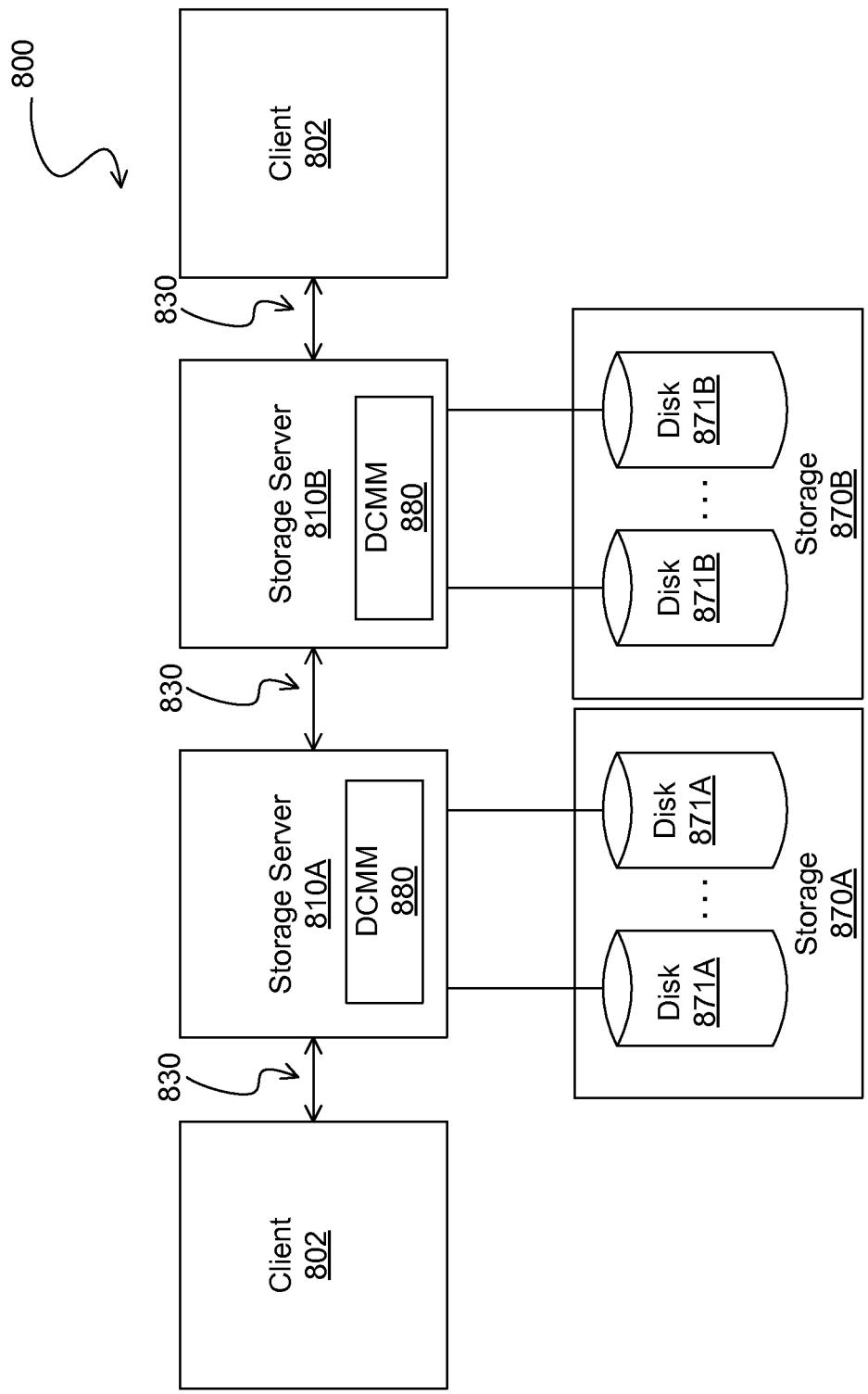
FIG. 8A illustrates a network storage system in which addressing service-level objectives (SLOs) violations may be implemented.

FIG. 8A shows a network storage system 800 in which graph transformations can be used to correct violations of service level objectives in one embodiment. Storage servers 810 each include a DCMM 880 module for using graph transformations to correct violations of service level objectives. Storage servers 810 (storage servers 810A, 810B), such as storage system 115 of FIG. 1, each manage multiple storage units 870 (storage 870A, 870B) that include mass storage devices, such as storage 135 of FIG. 1. These storage servers provide data storage services to one or more clients 802 through a network 830. Network 830 may be, for example, a local area network (LAN), wide area network (WAN), metropolitan area network (MAN), global area network such as the Internet, a Fibre Channel fabric, or any combination of such interconnects. Each of clients 802 may be, for example, a conventional personal computer (PC), server-class computer, workstation, handheld computing or communication device, or other special or general purpose computer, such as organization data system 105 of FIG. 1.

Storage units 870 constitute mass storage devices which can include, for example, flash memory, magnetic or optical disks, or tape drives, illustrated as disks 871 (871A, 871B). The storage devices 871 can further be organized into arrays (not illustrated) implementing a Redundant Array of Inexpensive Disks/Devices (RAID) scheme, whereby storage servers 810 access storage units 870 using one or more RAID protocols known in the art.

Storage servers 810 can provide file-level service such as used in a network-attached storage (NAS) environment, block-level service such as used in a storage area network (SAN) environment, a service which is capable of providing both file-level and block-level service, or any other service capable of providing other data access services. Although storage servers 810 are each illustrated as single units in FIG. 8A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 8B and embodiments of a D-module and an N-module are described further below with respect to FIG. 10.

In yet other embodiments, storage servers 810 are referred to as network storage subsystems. A network storage subsystem provides networked storage services for a specific application or purpose. A network storage subsystem can also be implemented with a collection of networked resources provided across multiple storage servers and/or storage units.

Figure 8B:
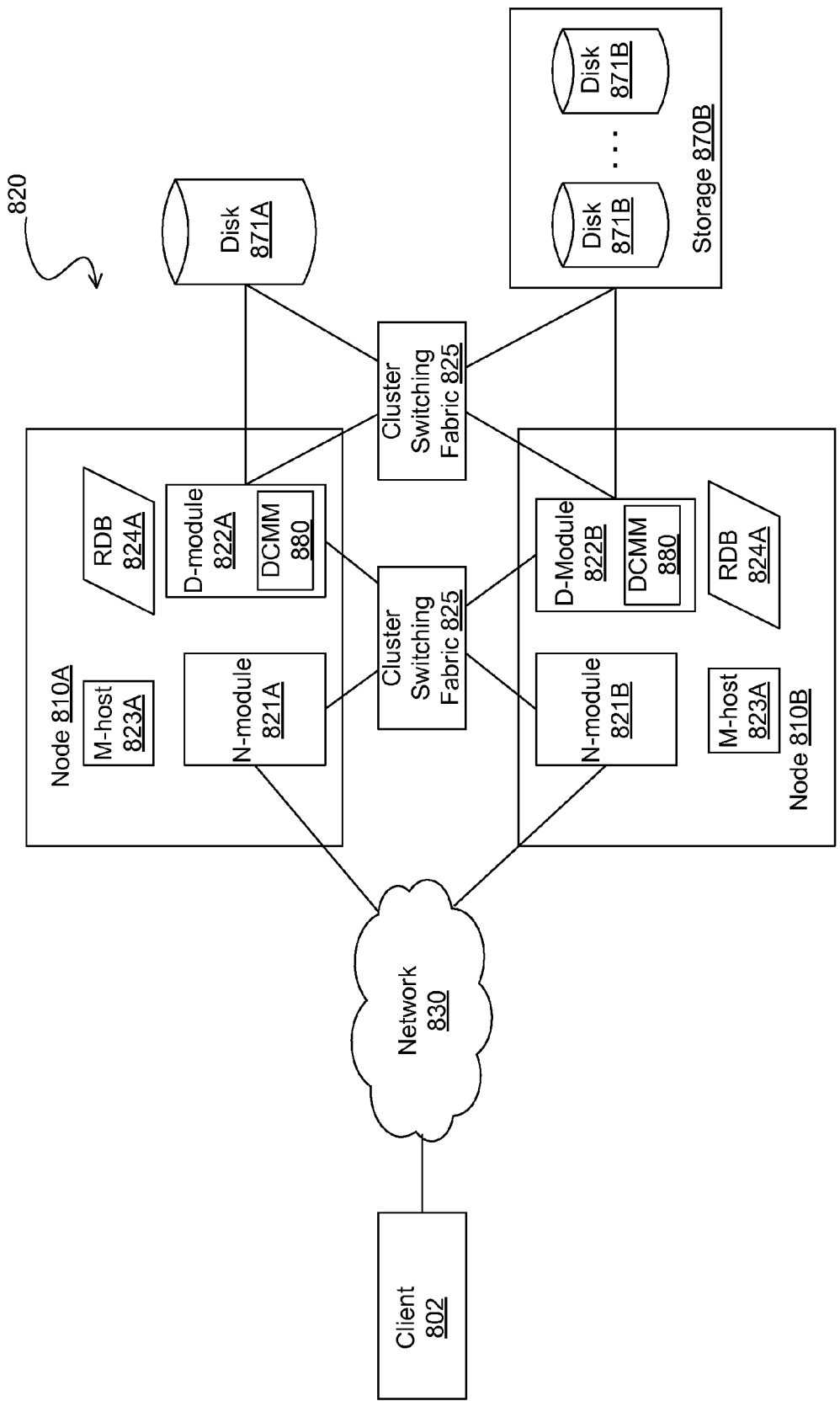
FIG. 8B illustrates a distributed or clustered architecture for a network storage system in which addressing service-level objectives (SLOs) violations may be implemented in an alternative embodiment.

It will be appreciate that in other embodiments, network storage system 800 may include more than two storage servers. FIG. 8B illustrates a block diagram of a distributed or clustered network storage system 820 which may use graph transformations to correct violations of service-level objectives in one embodiment. System 820 may include storage servers implemented as nodes 810 (nodes 810A, 810B) which are each configured to provide access to storage devices 871. In FIG. 8B, nodes 810 are interconnected by a cluster switching fabric 825, which may be embodied as an Ethernet switch.

Nodes 810 may be operative as multiple functional components that cooperate to provide a distributed architecture of system 820. To that end, each node 810 may be organized as a network element or module (N-module 821A, 821B), a disk element or module (D-module 822A, 822B), and a management element or module (M-host 823A, 823B). In one embodiment, each module includes a processor and memory for carrying out respective module operations. For example, N-module 821 may include functionality that enables node 810 to connect to client 802 via network 830 and may include protocol components such as a media access layer, Internet Protocol (IP) layer, Transport Control Protocol (TCP) layer, User Datagram Protocol (UDP) layer, and other protocols known in the art.

In contrast, D-module 822 may connect to one or more storage devices 871 via cluster switching fabric 825 and may be operative to service access requests on devices 870. In one embodiment, the D-module 822 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), a driver layer implementing storage device protocols (e.g., Small Computer Systems Interface protocol) for carrying out operations in support of storage access operations, and a DCMM 880 module for implementing graph transformations to correct violations of service-level objectives. In the embodiment shown in FIG. 8B, a storage abstraction layer (e.g., file system) of the D-module divides the physical storage of devices 870 into storage objects. Requests received by node 810 (e.g., via N-module 821) may thus include storage object identifiers to indicate a storage object on which to carry out the request.

Also operative in node 810 is M-host 823 which provides cluster services for node 810 by performing operations in support of a distributed storage system image, for instance, across system 820. M-host 823 provides cluster services by managing a data structure such as a RDB 824 (RDB 824A, RDB 824B) which contains information used by N-module 821 to determine which D-module 822 "owns" (services) each storage object. The various instances of RDB 824 across respective nodes 810 may be updated regularly by M-host 823 using conventional protocols operative between each of the M-hosts (e.g., across network 830) to bring them into synchronization with each other. A client request received by N-module 821 may then be routed to the appropriate D-module 822 for servicing to provide a distributed storage system image.

It should be noted that while FIG. 8B shows an equal number of N- and D-modules constituting a node in the illustrative system, there may be different number of N- and D-modules constituting a node in accordance with various embodiments of addressing service-level objectives violations. As such, the description of a node comprising one N-module and one D-module for each node should be taken as illustrative only.

Figure 9:
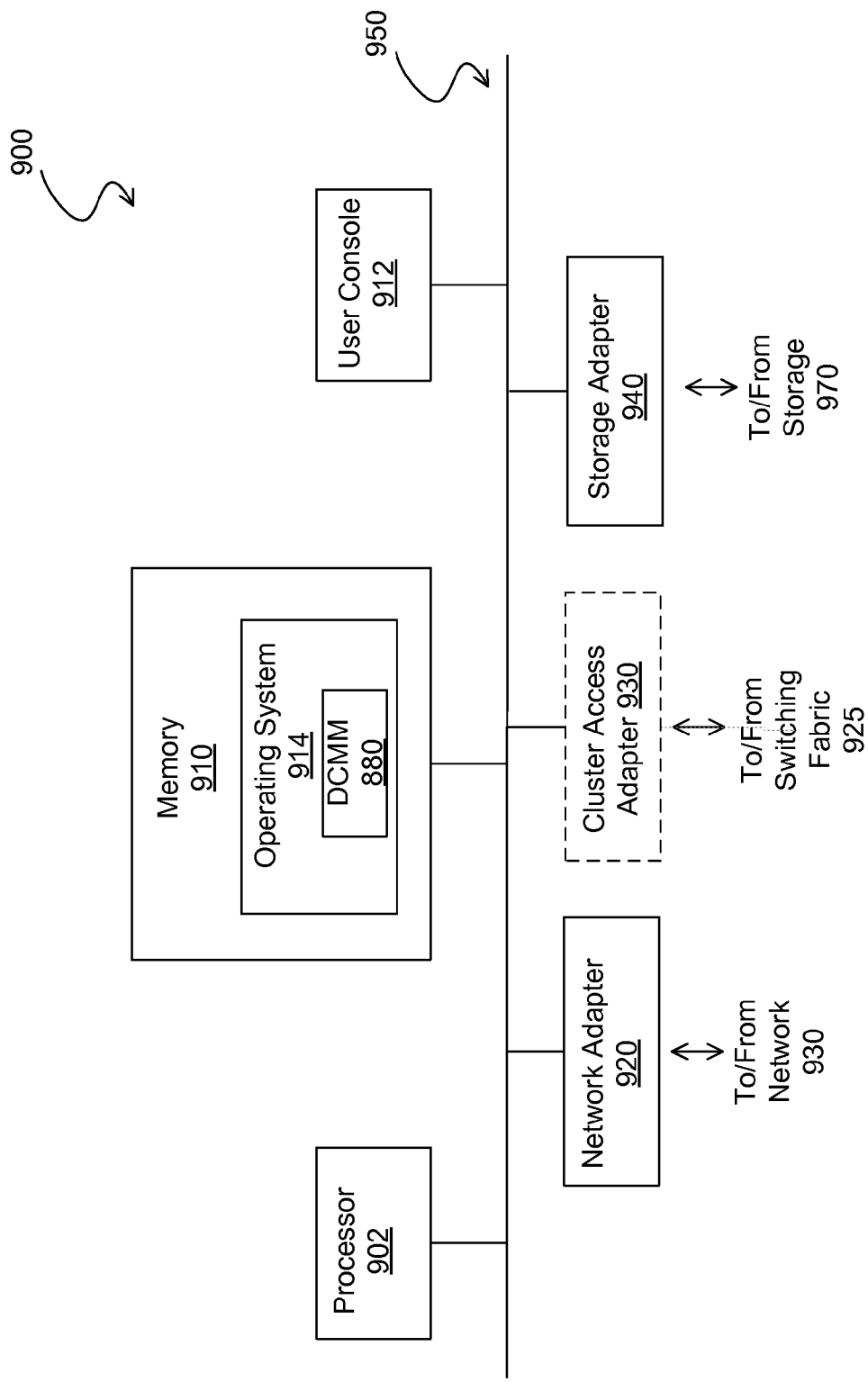
FIG. 9 is a block diagram of an illustrative embodiment of an environment including a data center management module of FIG. 1 in which addressing service-level objectives (SLOs) violations may be implemented.

FIG. 9 is a block diagram of an embodiment of a storage server, such as storage servers 810A and 810B of FIG. 8A, embodied as a general or special purpose computer including a processor 902, a memory 910, a network adapter 920, a user console 912 and a storage adapter 940 interconnected by a system bus 950, such as a convention Peripheral Component Interconnect (PCI) bus.

Memory 910 includes storage locations addressable by processor 902, network adapter 920 and storage adapter 940 for storing processor-executable instructions and data structures associated with graph transformations for correcting violations of service level objectives. Storage operating system 914, portions of which are typically resident in memory 910 and executed by processor 902, functionally organizes the storage server by invoking operations in support of the storage services provided by the storage server. Storage operating system 914 further includes DCMM 880 for implementing graph transformations to correct violations of service-level objectives. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 902 and executable software can be implemented by hardware, such as integrated currents configured as programmable logic arrays, ASICs, and the like.

Network adapter 920 comprises one or more ports to couple the storage server to one or more clients over point-to-point links or a network. Each client may communicate with the storage server over the network by exchanging discrete frames or packets of data according to pre-defined protocols, such as TCP/IP.

Storage adapter 940 includes a plurality of ports having input/output (I/O) interface circuitry to couple the storage devices (e.g., disks) to bus 921 over an I/O interconnect arrangement, such as a conventional high-performance, FC or SAS link topology. Storage adapter 940 typically includes a device controller (not illustrated) comprising a processor and a memory for controlling the overall operation of the storage units in accordance with read and write commands received from storage operating system 914. User console 912 enables an administrator to interface with the storage server to invoke operations and provide inputs to the storage server using a command line interface (CLI) or a graphical user interface (GUI). In one embodiment, user console 912 is implemented using a monitor and keyboard.

Figure 10:
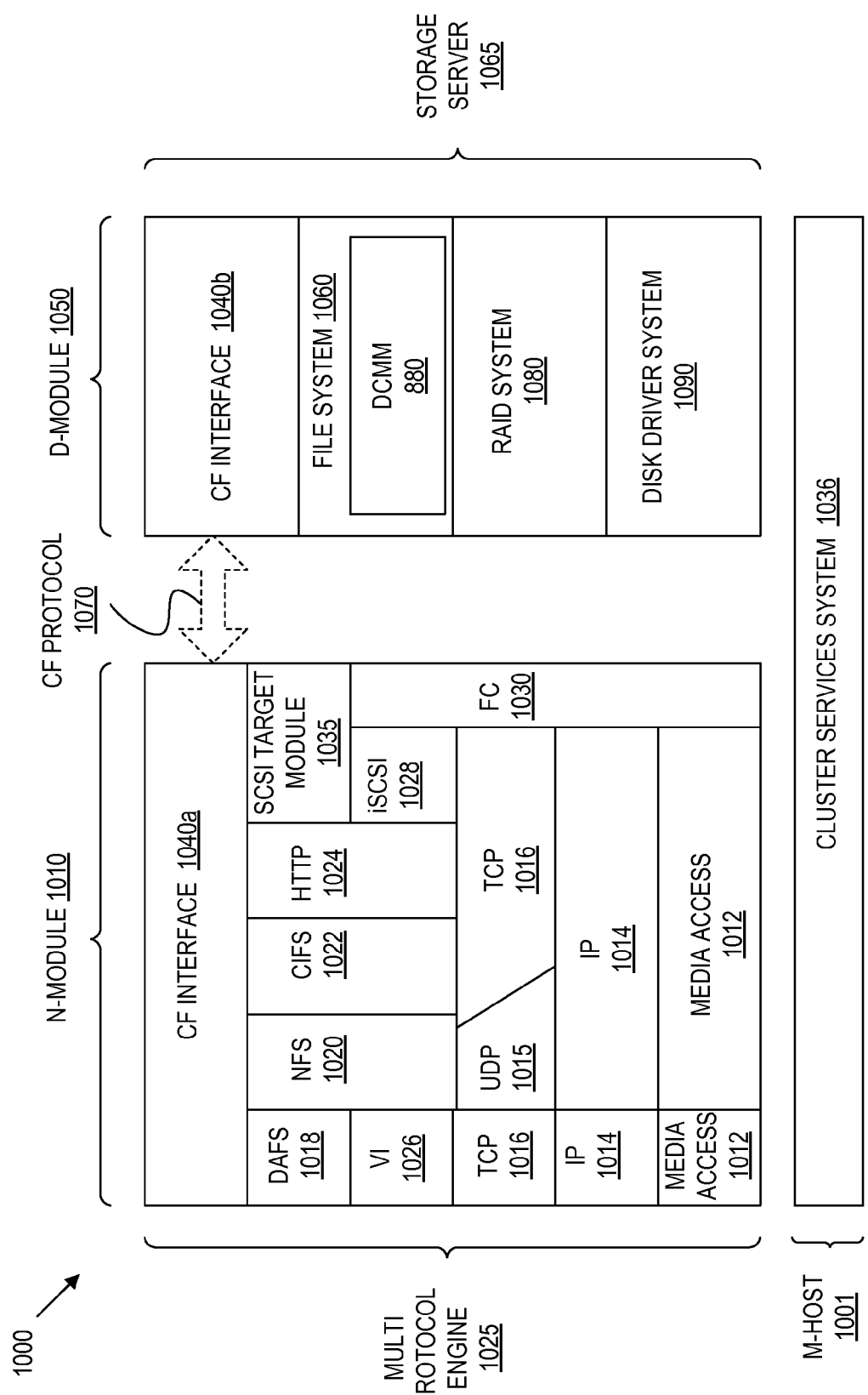
FIG. 10 illustrates an embodiment of the storage operating system in which addressing service-level objectives (SLOs) violations may be implemented.

When implemented as a node of a cluster, such as cluster 820 of FIG. 8B, the storage server further includes a cluster access adapter 930 (shown in phantom) having one or more ports to couple the node to other nodes in a cluster. FIG. 10 is a block diagram of a storage operating system, such as storage operating system 914 of FIG. 9 that implements an embodiment of correcting service-level objectives violations using graph transformations, shown as DCMM 880 and described further below. The storage operating system comprises a series of software layers executed by a processor, such as processor 902 of FIG. 9, and organized to form an integrated network protocol stack or, more generally, a multi-protocol engine 1025 that provides data paths for clients to access information stored on the storage server using block and file access protocols.

Multi-protocol engine 1025 includes a media access layer 1012 of network drivers (e.g., gigabit Ethernet drivers) that interface with network protocol layers, such as the IP layer 1014 and its supporting transport mechanisms, the TCP layer 1016 and the User Datagram Protocol (UDP) layer 1015. A file system protocol layer provides multi-protocol file access and, to that end, includes support for the Direct Access File System (DAFS) protocol 1018, the NFS protocol 1020, the CIFS protocol 1022 and the Hypertext Transfer Protocol (HTTP) protocol 1024. A VI layer 1026 implements the VI architecture to provide direct access transport (DAT) capabilities, such as RDMA, as required by the DAFS protocol 1018. An iSCSI driver layer 1028 provides block protocol access over the TCP/IP network protocol layers, while a FC driver layer 1030 receives and transmits block access requests and responses to and from the storage server. In certain cases, a Fibre Channel over Ethernet (FCoE) layer (not shown) may also be operative in multi-protocol engine 1025 to receive and transmit requests and responses to and from the storage server.

The storage operating system also includes a series of software layers organized to form a storage server 1065 that provides data paths for accessing information stored on storage devices.

File system 1060 implements a virtualization system of the storage operating system through the interaction with one or more virtualization modules (illustrated as a SCSI target module 1035).

Operationally, a request from a client is forwarded as a packet over the network and onto the storage server where it is received at a network adapter. A network driver such as layer 1012 or layer 1030 processes the packet and, if appropriate, passes it on to a network protocol and file access layer for additional processing prior to forwarding to file system 1060. There, file system 1060 generates operations to load (retrieve) the requested data from the disks if it is not resident "in core", i.e., in memory 1010. If the information is not in memory, file system 1060 accesses the inode file to retrieve a logical vbn and passes a message structure including the logical vbn to the RAID system 1080. There, the logical vbn is mapped to a disk identifier and device block number (disk, dbn) and sent to an appropriate driver of disk driver system 1090. The disk driver accesses the dbn from the specified disk and loads the requested data block(s) in memory for processing by the storage server. Upon completion of the request, the node (and operating system 1000) returns a reply to the client over the network.

It should be noted that the software "path" through the storage operating system layers described above needed to perform data storage access for the client request received at the storage server adaptable to the teachings of the invention may alternatively be implemented in hardware. It is expressly contemplated that the various processes, architectures and procedures described herein can be implemented in hardware, firmware or software.

When implemented in a cluster, data access components of the storage operating system may be embodied as D-module 1050 for accessing data stored on disk. In contrast, multi-protocol engine 1025 may be embodied as N-module 1010 to perform protocol termination with respect to a client issuing incoming access over the network, as well as to redirect the access requests to any other N-module in the cluster. A cluster services system 1036 may further implement an M-host (e.g., M-host 1001) to provide cluster services for generating information sharing operations to present a distributed file system image for the cluster. For instance, media access layer 1012 may send and receive information packets between the various cluster services systems of the nodes to synchronize the replicated databases in each of the nodes.

In addition, a cluster fabric (CF) interface module 1040 (CF interface modules 1040A, 1040B) may facilitate intra-cluster communication between N-module 1010 and D-module 1050 using a CF protocol 1070. CF interface module 1040 can be organized as a CF encoder/decoder using local procedure calls (LPCs) and remote procedure calls (RPCs) to communicate a file system command to between D-modules residing on the same node and remote nodes, respectively.

Correcting service-level objectives violations using graph transformations requires receiving an indication of a violation of a service-level objective associated with the data center including a network storage system and generating mutated graphs for the data center, and may be performed by DCMM 880 in file system 1060. A list of transformations is obtained from RAID system 1080. The mutated graphs are generated by processing a transformation from the list of transformations and updating the graph representation for the data center as a result of the processing.

Although the present invention is shown herein to correct service-level objectives violations using graph transformations within the storage operating system, it will be appreciated that correcting service-level objectives violations using graph transformations may be implemented in other modules or components of the storage server in other embodiments. In addition, correcting service-level objectives violations using graph transformations may be implemented as one or a combination of a software-executing processor, hardware or firmware within the storage server. As such, correcting service-level objectives violations using graph transformations may directly or indirectly interface with modules of the storage operating system in accordance with teachings of the present invention.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, and a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including conventional write in place file systems.

In practice, the methods 300, 400, and 500 may constitute one or more programs made up of computer-executable instructions. Describing the methods with reference to the flowchart in FIGS. 3, 4, and 5 enables one skilled in the art to develop such programs, including such instructions to carry out the operations (acts) represented by logical blocks 300 until 350, 400 until 420, and 500 until 530 on suitably configured computers (the processor of the computer executing the instructions from computer-readable media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the method illustrated in FIGS. 3, 4, and 5 without departing from the scope of the invention and that no particular order is implied by the arrangement of blocks shown and described herein.

Graph transformations to correct service-level objectives violations have been described. Although specific embodiments have been illustrated and described herein, it will be appreciated by those of ordinary skill in the art that any arrangement which is determined to achieve the same purpose may be substituted for the specific embodiments shown. This application is intended to cover any adaptations or variations of the present invention.

Moreover, the description of FIGS. 8A-8B is intended to provide an overview of computer hardware and other operating components suitable for performing the methods of the invention described above, but are not intended to limit the applicable environments. One of skill in the art will immediately appreciate that the invention can be practiced with other computer system configurations. The invention can also be practiced in distributed computing environments where tasks are performed by remote processing devices that are linked through a communications network.

It will be readily apparent to one of skill, that input/output devices, such as a keyboard, a pointing device, and a display, may be coupled to the storage server. These conventional features have not been illustrated for sake of clarity.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable storage medium" includes any type of volatile or non-volatile storage device that is accessible by a processor.

Therefore, it is manifestly intended that this invention be limited only by the following claims and equivalents thereof.

The invention claimed is:

1. A computer-implemented method for managing a data center, the computer-implemented method comprising:
receiving, by a data management system including a data server, an indication of a violation of a service-level objective associated with the data center;
retrieving, by the data management system, a graph representation and a transformations data container from data storage accessible to the data management system, the transformations data container including one or more transformations;
for each transformation in the transformations data container, processing, by the data management system, the transformation to create a mutated graph from the graph representation; and
determining, by the data management system, an option for managing the data center as a result of evaluating the mutated graphs.

2. The computer-implemented method of claim 1, further comprising creating the graph representation for the data center, wherein creating the graph representation for the data center comprises:
    evaluating, by the data management system, the data center to determine a plurality of entities in the data center;
    for each of the plurality of entities in the data center, generating, by the data management system, an entity representation;
    for each of the plurality of entity representations, analyzing, by the data management system, the entity representation to determine a connection thr the entity representation and another entity representation of the plurality of entity representations; and
    connecting, by the data management system, the entity representation to the another entity representation using the determined connection.

3. The computer-implemented method of claim 1, further comprising:
    automatically selecting, by the data management system, an option for managing the data center based on a cost associated with the option.

4. The computer-implemented method of claim 1, wherein the graph representation represents a flow of data between the plurality of entities in the data center.

5. The computer-implemented method of claim 1, wherein each transformation is in accordance with the service-level objective.

6. The computer-implemented method of claim 1, wherein each transformation comprises a name, a type, a predicate defining a scope of the transformation, a mutation defining a set of graph changes to correct a violation of a service level objective, and a cost of the transformation.

7. The computer-implemented method of claim 1, wherein processing a transformation to create a mutated graph comprises:
    accessing a predicate associated with the transformation;
    determining if an entity in the data center graph representation is in accordance with the predicate;
    if an entity in the data center graph representation is in accordance with the predicate,
        retrieving a imitation associated with the transformation, and
        performing an action associated with the mutation to update the mutated graph.

8. A non-transitory computer-readable storage medium embodied with executable instructions that cause a processor to perform operations comprising:
    receiving, by a data management system including a data server, an indication of a violation of a service-level objective associated with the data center;
    retrieving, by the data management system, a transformations data container including one or more transformations from data storage accessible to the data management system;
    for each transformation in the transformations data container, processing, by the data management system, a transformation to create a mutated graph from the a graph representation; and
    determining, by the data management system, an option for managing the data center as a result of evaluating the mutated graphs.

9. The non-transitory computer-readable storage medium of claim 8, wherein the instructions further comprise creating the graph representation for the data center, wherein creating the graph representation for the data center comprises:
    evaluating, by the data management system, the data center to determine a plurality of entities in the data center;
    for each of the plurality of entities in the data center, generating, by the data management system, an entity representation;
    for each of the plurality of entity representations,
        analyzing, by the data management system, the entity representation to determine a connection for the entity representation and another entity representation of the plurality of entity representations; and
        connecting, by the data management system, the entity representation to the another entity representation using the determined connection.

10. The non-transitory computer-readable storage medium of claim 8, wherein the instructions further comprise:
    automatically selecting, by the data management system, an option for managing the data center based on a cost associated with the option.

11. The non-transitory computer-readable storage medium of claim 8, wherein the graph representation represents a flow of data between the plurality of entities in the data center.

12. The non-transitory computer-readable storage medium of claim 8, wherein each transformation is in accordance with the service-level objective.

13. The non-transitory computer-readable storage medium of claim 8, wherein each transformation comprises a name, a type, a predicate defining a scope of the transformation, a mutation defining a set of graph changes to correct a violation of a service level objective, and a cost of the transformation.

14. The non-transitory computer-readable storage medium of claim 8, wherein processing a transformation to create a mutated graph comprises:
    accessing a predicate associated with the transformation;
    determining if an entity in the data center graph representation is in accordance with the predicate;
    if an entity in the data center graph representation is in accordance with the predicate,
        retrieving a mutation associated with the transformation, and
        performing an action associated with the mutation to update the mutated graph.

15. A computerized system comprising:
a processor coupled to a memory through a bus; and
instructions executed from the memory by the processor to cause the processor to
    receive an indication of a violation of a service-level objective associated with the data center;
    retrieve a transformations data container including one or more transformations from data storage accessible to the data management system;
    for each transformation in the transformations data container, process a transformation to create a mutated graph from the a graph representation; and
    determine an option for managing the data center as a result of evaluating the mutated graphs.

16. A computerized system comprising:
a storage server coupled to a storage device, the storage server operative to:
    receive an indication of a violation of a service-level objective associated with the data center;
    retrieve a transformations data container including one or more transformations from data storage accessible to the data management system;
    for each transformation in the transformations data container, process a transformation to create a mutated graph from the a graph representation; and determine an option for managing the data center as a result of evaluating the mutated graphs.

* * * * *